United States Patent Office 2,857,369
Patented Oct. 21, 1958

2,857,369
SEPARATION OF LINEAR POLYETHYLENE

Edwin David Johnson, Wilmington, Del., assignor to E. I. du Pont de Nemours and Company, Wilmington, Del., a corporation of Delaware No Drawing. Application March 1, 1957
Serial No. 643,243

2 Claims. (Cl. 260—94.9)

The process of the present invention relates to the separation of ethylene polymers and in particular to the separation of low molecular weight polymer fractions from high molecular weight polymer fractions of linear polyethylenes.

Recently it was discovered that ethylene can be polymerized to linear polymers, i. e., polymers having a minimum of side chains, by employing a catalyst obtained on reacting a transition metal compound and particularly halides of titanium, zirconium, vanadium, tungsten, molybdenum and chromium with a metal alkyl, Grignard reagent or metal hydride. It is believed that the metal alkyl and similar compounds react with the transition metal compound forming a complex containing the transition metal in a reduced valence state. The reduced transition metal is believed to coordinate with ethylenically unsaturated monomers and thereby cause their polymerization. These catalysts have therefore been referred to as coordination catalysts.

In the polymerization of ethylene to linear polymers employing these coordination catalysts, the polymers obtained, although of very high average molecular weight, contain a low molecular weight fraction due to the wide molecular weight distribution of the polymer. Although the molecular weight distribution can be controlled to a certain degree by polymerization conditions, sufficient of the low molecular weight fraction remains in the polymer to significantly affect the properties of the polymer. The removal of this low molecular weight fraction, hereinafter referred to as grease, to the extent that it affects the polymer properties is highly desirable, since the grease tends to plasticize the polymer, thus decreasing such important properties of linear polyethylene as its high temperature stability, stiffness, tensile strength and solvent resistance.

The linear polyethylenes employed in the process of the present invention vary significantly in their properties from the branched polyethylenes known heretofore. Not only are the polymers structurally different, as pointed out above, but in addition average molecular weights of linear polyethylenes are significantly higher than those of the branched polyethylenes, i. e., 60,000 to 1,000,000 for linear polyethylenes and 5,000 to 50,000 for branched polyethylenes. These differences are reflected in the physical properties of the polymer. The melting point of branched polyethylene is for example, around 110° C., the melting point of linear polyethylenes is around 130° C. Similarly the stiffness of linear polyethylene is about 120,000 p. s. i. at room temperature, whereas the stiffness of branched polyethylene under the same conditions is only about 80,000 p. s. i. This change in structure also affects the solubility of the polymer in hydrocarbon solvents significantly, the solubility decreases as the linearity and the molecular weight of the polymer is increased. Thus in many cases the fractionation techniques applicable to branched polyethylenes are not applicable to linear polyethylenes.

The low molecular weight fraction defined herein as grease is that polymer fraction which is soluble in refluxing benzene. Although low molecular weight polymer can be separated by refluxing with benzene, such a process is practical only for small polymer quantities. On a large scale, such an operation is time consuming and expensive, and furthermore does not give rise to a uniform product.

It is therefore the primary object of the present invention to provide a process for separating grease from high molecular weight polymers of ethylene. It is another object to provide a process for separating grease which can be carried out rapidly and continuously and can readily be controlled.

The objects of the present invention are accomplished by a process which comprises heating a solution of linear polyethylene to above the melting point of the polymer and preferably to above the critical temperature of the solvent under sufficient pressure to maintain the density of the solvent vapor, or liquid solvent, in the polymer-solvent phase above the precipitation density of the solvent, reducing the pressure to cause the density of the solvent in the vapor or liquid polymer-solvent phase to drop to below the precipitation density, while preferably maintaining the temperature above the critical temperature and removing as separate streams, molten high molecular weight polymer and a solvent-low molecular weight polymer phase.

It was discovered in accordance with the present invention that differences in the density of a solvent vapor occurring under specific pressure and temperature conditions can be employed to separate high molecular weight linear polymers of ethylene from low molecular weight, polymer greases. It had heretofore been known that polyethylene can be solidified in stages from a mixture containing (1) monomer, (2) low molecular weight polymer, and (3) high molecular weight polymer, by decreases in pressure. However, it had always been assumed that such pressure separations could only be accomplished at very high pressures, i. e., pressures exceeding at least 500 atmospheres. It is therefore highly surprising that separations of polymer from solvent vapor can be carried out at much lower pressures and it is particularly surprising that such a separation at lower pressures is effective on separating linear polymers of much higher molecular weight from polymers of low molecular weight. Thus it was found that although the solubility of the linear polyethylene in hydrocarbon solvents generally increases with temperature, precipitation of the high molecular weight polymer occurs when a specific density of the solvent is reached by increasing the temperature. This density is referred to hereinafter as the precipitation density. It is characteristic of the solvent, and does not vary as between liquid and vapor phases. Thus for example, linear polyethylene is practically insoluble in cyclohexane at room temperatures but does go into solution at the crystalline melting point of the polymer. The polymer remains in solution over the range of 130–240° C. but as the temperature reaches 240° C. the polymer precipitates out of solution because the density is not sufficiently high enough to maintain the polymer in solution. If the temperature is then further increased to above the critical temperature to about 300° C. and the pressure increased to approximately 1500 p. s. i., the polymer is redissolved in the supercritical vapor and can be precipitated again by decreasing the pressure to cause the density of the solvent in the polymer solvent phase to drop below the precipitation density of the solvent.

The process of the present invention is preferably carried out at temperatures above the critical temperature of the solvent. Although the solvent can not exist as a true liquid at temperatures above the critical temperature, it is possible by increasing the pressure to increase the density of the solvent in the supercritical phase to above the precipitation density of the solvent and thus obtain a homogeneous polymer-solvent phase. If the density of the polymer-solvent phase is then decreased below the precipitation density of the solvent, by decrease in pressure, precipitation of the high molecular weight polymer will occur, which can then be removed as a separate phase. At temperatures above the critical temperatures only two phases exist, one the supercritical vapor phase containing the grease, and two the liquid polymer phase. Separation of the vapor from the liquid phase is readily accomplished due to the difference in gravity of the two phases. At temperatures above the critical temperature the density of the solvent is furthermore more readily controlled than at temperatures below the critical temperature, the control being accomplished by mere changes in pressure.

The process may be similarly employed at temperatures below the critical temperature of the solvent. In that case the density of the solvent in the polymer-solvent phase is controlled by the temperature and the fractions that are formed are a liquid high molecular weight polymer fraction and a low molecular weight polymer liquid solvent fraction.

The exact temperatures and pressures under which the polymer separation of the present invention is effected vary with the solvent employed for the polymer and are dependent on the precipitation density and the critical temperature of the solvent. Critical temperatures of solvents may be obtained from such sources as International Critical Tables; Chemical Engineers Handbook by Perry; Data Book on Hydrocarbons by Maxwell. The precipitation density of the solvent is readily determined by small scale experiments such as heating sample solutions of the polymer under known temperature and pressure conditions until the polymer precipitates out of the polymer-solvent phase and calculating the density of the solvent from the pressure, the temperature, the volume of the solvent and known thermodynamic constants. In the table below are given the precipitation densities of some of the solvents useful as solvents for ethylene polymers. These values were determined employing samples of polymer solutions under autogeneous pressure:

| Solvent | Critical Temperature, °C. | Precipitation Temperature, °C. | Precipitation Density, g./cc. |
| --- | --- | --- | --- |
| Cyclohexane | 281 | 240 | 0.52 |
| Benzene | 288.5 | 280 | 0.46 |
| n-heptane | 266.8 | 180 | 0.52 |
| n-hexane | 234.8 | 153 | 0.52 |
| Toluene | 320.6 | 300 | 0.46 |

The solvents employed in the process of the present invention are preferably hydrocarbon solvents, which are useful in the polymerization of ethylene as polymerization media. Particularly suitable solvents are saturated aliphatic, cycloaliphatic and aromatic hydrocarbons having from 5 to 10 carbon atoms such as the solvents listed hereinabove. The concentration of the polymer in the solvent does not affect the separation of the two phases; however, a more efficient separation of polymer and grease is obtained when the concentration of the polymer is less than 20% by weight of the solvent.

The process of the present invention is preferably carried out by dissolving the polymer in the solvent at elevated temperature, passing the resulting solution into a heat exchanger where the solution is heated, under sufficient pressure to maintain a homogeneous mixture, to a temperature above the critical temperature of the solvent and then passing the resulting supercritical vapor through a pressure letdown valve into an intermediate pressure separator. The intermediate pressure separator is maintained at a temperature above the critical temperature and at a pressure which results in a solvent density below the precipitation density. From the intermediate pressure separator the molten polymer and some residual solvent is taken off the bottom and solvent vapor and grease vent is taken off the top. The polymer can then be passed into a low pressure separator where the residual solvent is flashed off. The supercritical solvent vapor containing the grease is cooled to temperatures at which the solvent is liquid. The grease-solvent solution can be separated by distillation of the solvent. The distilled solvent can then be recycled to the polymerization unit. The degree of separation of polymer from grease according to the process of the present invention will depend on how far below the precipitation density the density of the supercritical vapor is decreased in the separation step. The greater the difference between the precipitation density and the density maintained in the separation step, the less efficient the separation of polymer and grease. The solvent density maintained during separation can, of course, be lowered to such a degree that the grease will precipitate with the polymer. Such lowering must, of course, be avoided in order for separation to occur. The density of supercritical vapor in the separation step will depend on the type of product desired. If it is desired to have a product containing little or no grease, the density of the vapor in the separator is just slightly below the precipitation density of the solvent. For some products small amounts of grease, less than 2% for instance, may be tolerated, since such quantities do not affect the properties significantly, but do facilitate fabrication. In such a case the density in the separation may be a little lower. Since the density of the solvent in the supercritical phase is accurately and easily controlled by pressure, the process of the present invention presents a highly versatile method for the separation of low molecular weight polymer fractions from high molecular weight polymer.

The process of the present invention is further illustrated by the following examples:

*Example I*

Into a 1' long, 2" diameter reactor was charged 350 ml. of cyclohexane, 11 g. of low molecular weight polyethylene grease and 44 g. of high molecular weight linear polyethylene, which had previously been extracted with benzene to remove all grease. The mixture was heated with agitation under autogeneous pressure to form a polymer solution. Samples of the polymer were removed from the top of the reactor at temperatures and pressures listed below and analyzed for polymer and grease content. The following results were obtained:

| Temperature, °C. | Pressure, p.s.i. | Weight of Sample, g. | Wt. Percent of Grease in Sample | Wt. Percent of Polymer | Density |
| --- | --- | --- | --- | --- | --- |
| 255 | 500 | 27 | 2.6 | 1.1 | .55 |
| 300 | 650 | 28 | 2.6 | | .25 |
| 316 | 800 | 33 | 1.7 | | |
| 302 | 600 | 22 | 1.7 | | |
| 295 | 550 | 35 | | | .15 |

The above runs illustrate the existence of three types of situations which can arise under the conditions of these runs. In the first run, both polymer and grease are dissolved in the solvent, the density of the solvent being above the precipitation density of the solvent, and thus the sample contains both polymer and grease. The next three runs were made at a solvent density below the precipitation density and illustrate the separation process of the present invention. The reduced density of the solvent causes the high molecular weight material to precipitate out of the supercritical vapor phase but the grease remains in the vapor and is removed with the solvent-vapor from the top of the vessel. The last run shows a further lowering of the vapor density to a point where even the grease will separate and only solvent is removed from the top of the reactor.

Example II

A polymer solution in cyclohexane as obtained from the polymerization of ethylene with an organometallic catalyst containing from 9 to 11% of the polyethylene by weight of the solvent was pumped into a heat exchanger where the temperature of the solution was increased to 315° C. and the pressure was increased to 1800 p. s. i. The polymer solution was then passed through a pressure letdown valve into an intermediate pressure separator in which the temperature and pressure conditions were as indicated in the table below. The precipitated molten polymer was then passed from the intermediate pressure separator through a second pressure letdown valve into a low pressure separator maintained at atmospheric pressure causing the remaining solvent to flash off. The grease content of the polymer both prior to and after separation was measured. The following results were obtained:

| Run | Intermediate Pressure Separator | | Polymer Grease Content | |
|---|---|---|---|---|
| | Pressure, p. s. i. | Temperature, ° C. | Before Separation, Percent | After Separation, Percent |
| 1 | 1,000 | 295 | 5.4 | 0.8 |
| 2 | 800 | 285 | 4.2 | 1.4 |
| 3 | 1,200 | 300 | 9.5 | 1.6 |
| 4 | 800 | 288 | 4.6 | .98 |
| 5 | 1,000 | 303 | 4.6 | .93 |
| 6 | 1,000 | 320 | 4.6 | 1.00 |
| 7 | 1,100 | 300 | 4.6 | 0.66 |

As can be seen from these results the closer the precipitation density of the solvent in the solvent-polymer mixture is approached by control of temperature and pressure, the more complete is the separation of the polymer from the grease.

The above examples have illustrated the process of the present invention with respect to cyclohexane as the solvent for the polymer. Although cyclohexane, because of its solubility characteristics and relatively low critical temperatures, is the preferred solvent, the separation process is equally well applicable to other hydrocarbon solvents useful for dissolving linear polyethylene at temperatures above the melting point. The separation process may be employed on a continuous basis or batchwise. The process of the present invention is particularly useful in combination with a polymerization process wherein the polymer is formed as a solution in the polymerization medium since such a process will eliminate the need for a separate solution step.

The process of the present invention is not limited to polymers of ethylene made by the coordination catalysts described hereinabove but is applicable to ethylene polymers made by all types of catalysts. The process is furthermore applicable to homopolymers of ethylene as well as copolymers of ethylene with such monomers as propylene, butene and other terminally unsaturated olefins.

I claim:

1. The process of separating high molecular weight linear polyethylene from low molecular weight polymer fractions which comprises forming a solution of a mixture thereof in a hydrocarbon solvent, heating the resulting solution to a temperature above the critical temperature of said solvent under a sufficient pressure to maintain the density of the solvent in the polymer-solvent phase above the precipitation density and then lowering the pressure to cause the density of the solvent in the polymer-solvent phase to drop below the precipitation density while maintaining the temperature above the critical temperature of the solvent and recovering as separate phases the high molecular weight polymer and solvent-low molecular weight polymer mixture.

2. The process of separating low molecular weight polyethylene from high molecular weight linear polyethylene which comprises forming a solution of a mixture thereof in cyclohexane, heating said mixture to a temperature of at least 281° C. and a pressure of at least 1500 p. s. i. and then reducing the presusre to cause the density of the solvent to drop below 0.520 g./ml. while maintaining the temperature above 281° C. and recovering as separate streams a polyethylene containing less than 2% by weight of the polymer of the low molecular weight fraction and a cyclohexane low molecular weight polymer fraction mixture.

No references cited.